Dec. 22, 1964  W. M. HOKE  3,162,403
AIR VEHICLE CARRIAGE GEAR ASSEMBLY
Filed Feb. 1, 1963  2 Sheets-Sheet 1

INVENTOR.
WALTER M. HOKE
BY L E Carnahan
AGENT

Dec. 22, 1964  W. M. HOKE  3,162,403
AIR VEHICLE CARRIAGE GEAR ASSEMBLY
Filed Feb. 1, 1963  2 Sheets-Sheet 2
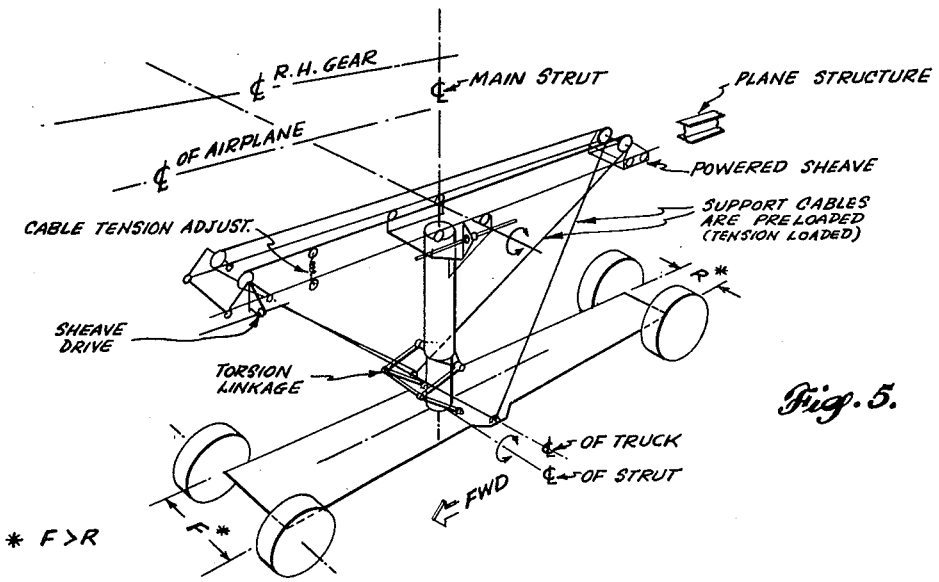
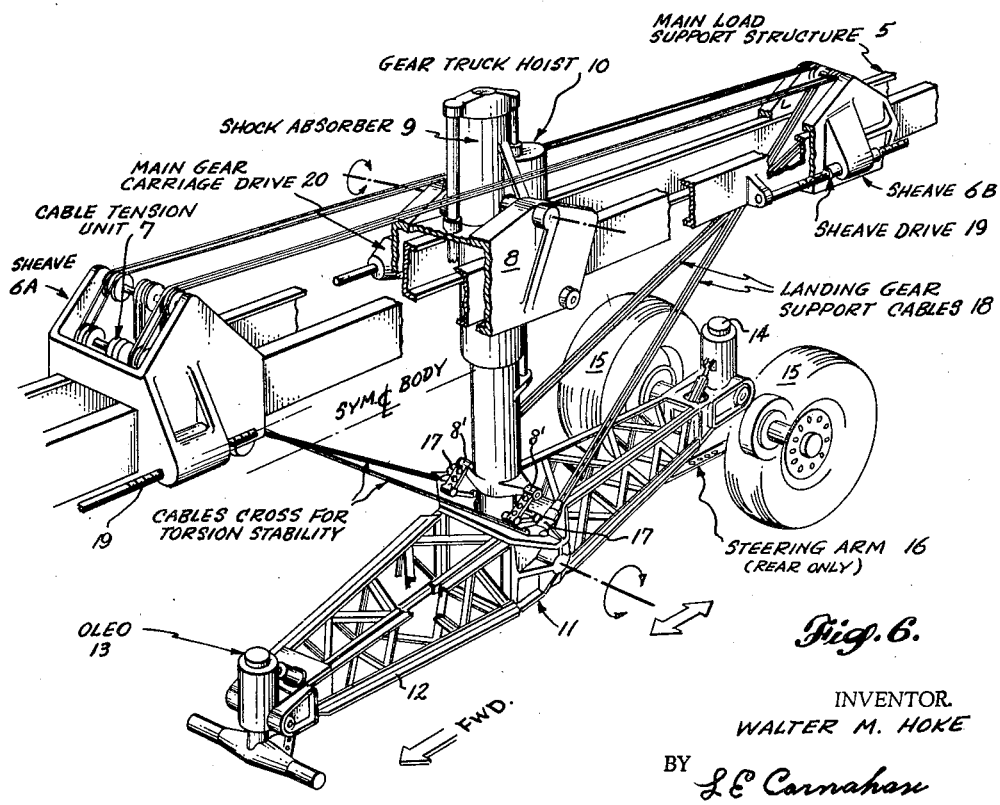
INVENTOR.
WALTER M. HOKE
BY L. E. Carnahan
AGENT …

3,162,403
AIR VEHICLE CARRIAGE GEAR ASSEMBLY
Walter M. Hoke, Seattle, Wash., assignor to The Boeing Company, Seattle, Wash., a corporation of Delaware
Filed Feb. 1, 1963, Ser. No. 255,482
11 Claims. (Cl. 244—100)

This invention relates to landing gear, and more particularly to landing gear that is movable with respect to the center of gravity of the associated vehicle.

The weight and size of modern aircraft creates a great problem in landing and/or takeoff gear design. There has been much research devoted to this problem area, with most of the prior art being directed to landing gear which is shiftable for maintaining the desired balance of the aircraft on the takeoff, when in flight or in landing, and during taxiing. The mechanism utilized in these prior art attempts increases the aircraft weight and thus reduces the possible payload.

Therefore, an object of the invention is to provide adjustable landing gear for carrying an air vehicle during takeoff, landing, and ground movement without increasing the weight of the vehicle.

A further object of the invention is to provide adjustable landing gear for air vehicles to eliminate hazards encountered by large supersonic and orbital vehicles due to increased landing and takeoff velocities and weights.

A still further object of the invention is to provide landing gear which is movable with respect to the center of gravity of the associated vehicle.

Another object of the invention is to provide landing gear which is movable to position the associated vehicle in the proper angle relative to the ground for both takeoff and landing.

Another object of the invention is to provide retractable aircraft landing gear construction capable of being adjusted longitudinally with respect to the fuselage.

Another object of the invention is to provide a landing gear of the retractable type comprising a main oleo strut joined by means including a torsion linkage to a truss-type structure having steerable wheels.

Another object of the invention is to provide a retractable aircraft landing gear capable of being adjusted longitudinally and/or vertically with respect to the fuselage by cable and powered sheave means.

These and other objects of the invention not specifically set forth above will become apparent from the accompanying description and drawings in which:

FIG. 5 shows schematically the left hand gear of the FIG. 1 vehicle; and

FIG. 6 is a detailed view of the FIG. 5 gear, sections being cut away or omitted for clarity.

The instant invention purports to overcome the problems in present day aircraft landing gear assemblies. The elimination of the nose wheel installation and subsequent structure design requirements by substituting the assembly of the instant invention for the conventional gear shows a weight saving of approximately 10,000 lbs. in a 500,000 lb. aircraft.

Briefly, the instant invention locates the gear within the fuselage in such a way that it may be shifted by a powered sheaving and cable system so as to locate the oleo or main load strut with respect to the center of gravity (C.G.) of the aircraft, the shift in C.G. being due to the full or empty state of the aircraft.

The gear assembly of the instant invention, described in detail hereinafter, utilizes the aircraft's own weight so that said aircraft can be raised to the proper angle for takeoff at some predetermined distance from the point where the takeoff run initiated. This same principle can be applied to landing in which case the wing area becomes a gigantic spoiler as the attack angle is increased after touch down, thus eliminating the need for drag chute installations which represent a weight saving in the neighborhood of 1,000 lbs. for a half million pound aircraft.

The instant invention described hereinafter accomplishes the following features which the prior known gear assemblies do not.

(1) *Braking.*—The assembly rotates the aircraft up at a sufficient angle to utilize the wing and body surfaces for aerodynamic braking. Thus wheel landing brakes are unnecessary except for ground handling.

(2) *Takeoff.*—The assembly can cause the aircraft to be rotated to the proper lift-off angle thus utilizing the mechanical advantage of having the wheels on the runway. If desirable, the aircraft could be rotated to the required lift-off angle before the run is started.

(3) *Landing.*—Future aerospace type aircraft will have to land at about a 20° angle. By positioning the landing gear practically under the landing C.G., the main gear stem can be extended to 25 or 30 feet without incurring large bending moments as the sheave-cable mechanism carries these loads in tension. Thus good ground clearance can be provided for high angle landings.

(4) *Nose wheel.*—The assembly eliminates the nose wheel altogether and thus accomplishes a great weight saving due to the fact that body bending caused by the nose wheel is also eliminated. This is as much as 12% to 15% on large aerospace plane designs.

(5) *Servicing.*—The assembly rotates the aircraft down to an angle at which it is easily accessible from the ground for servicing and loading or unloading of cargo.

(6) *Retractability.*—The assembly can be retracted into the fuselage to eliminate aerodynamic drag or to lower the aircraft with respect to the ground for storage in lower shelters.

Figure 1:
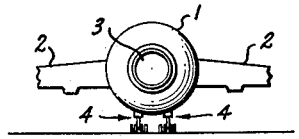
FIG. 1 is a rear view of an air vehicle utilizing the invention, the outer portion of the wings being cut away.
Figure 2:
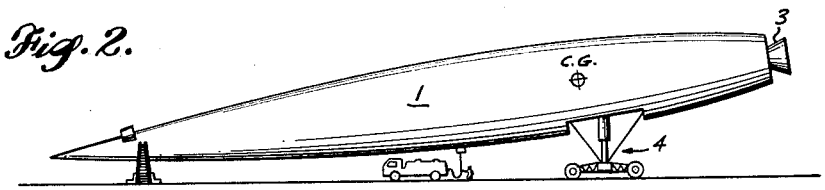
FIG. 2 is a side view of the vehicle of FIG. 1 being shown in servicing position, the wings being removed for clarity.
Figure 3:
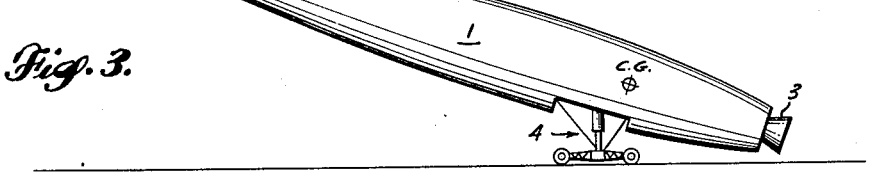
FIG. 3 is a view similar to FIG. 2 but showing the vehicle in landing-lift off position.
Figure 4:
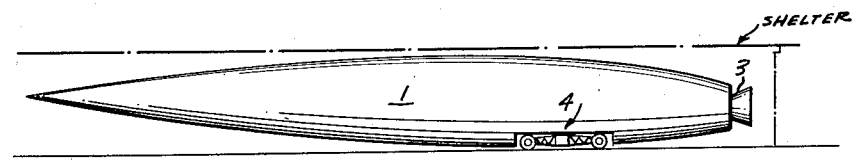
FIG. 4 is a view similar to FIG. 2 but showing the vehicle in storage position.

Referring now to the drawings, FIGS. 1–4 show an aircraft, such as an aerospace plane, having a fuselage 1, wings 2, propulsion nozzle means 3, and carriage gear assemblies generally indicated at 4. FIGS. 2 and 3 show the location of the center of gravity (C.G.) of the aerospace plane when the plane is in the servicing and landing-lift off positions.

FIGS. 5 and 6 show details of one of the carriage gear assemblies 4 which constitutes landing gear construction capable of being adjusted longitudinally of the fuselage so as to position said gear generally beneath the center of gravity of the aerospace plane. The landing gear is of the retractable type comprising a main oleo strut joined by means including a torsion linkage to a truss-type structure having two pair of wheels, the rear set of which are steerable. Actual adjustment of the gear is accomplished by cable and powered sheave means, said sheave means being two in number and being slidably mounted upon a track structure for powered fore and aft adjustment.

FIG. 5 schematically shows the relationship between basic elements of the gear assembly and the center lines (C.L.) of these elements.

Referring now to FIG. 6 which shows one of the carriage gear assemblies 4 in its operative relationship with respect to a main load support structure 5 which is fixedly attached to fuselage 1 of the aerospace plane. Main load support structure 5 consists, in this example, of two separated pieces of channeled material which functions as a guide rail for cable sheaves 6A and 6B, cable tension unit 7 and gear truck 8. Gear truck 8 includes shock absorber 9 and a gear truck hoist 10. Shock absorber 9 comprising a cylinder portion and a piston portion, the lower end of the piston portion being operatively attached to a frame assembly generally indicated at 11 through torsion linkages indicated at 8'. Frame assembly 11 includes a truss or frame 12, a forward oleo 13 and axle means for two front wheels (not shown), a rear oleo 14 and axle means for two rear wheels 15, and a steering arm 16 for the rear wheels. The front wheels are spaced further apart than the rear wheels (see FIG. 5) to provide for more efficient ground control.

Fixedly attached at 17 to frame assembly 11 are two sets of landing gear support cables 18, each set extending from frame assembly 11 to cable sheave 6A, cable sheave 6B, and back to frame assembly 11. The sets of support cables 18 cross each other between frame assembly 11 and cable sheave 6A and between cable sheave 6B and frame assembly 11 to provide torsion stability.

Drivingly connected to cable sheaves 6A and 6B are a pair of sheave drive means 19 which in cooperation with cable tension unit 7 functions to control the cables of the system to keep them tension loaded at all times by reefing in or playing out cable as required so as to regulate the tension and to prevent slack or whip lash action that might be experienced due to certain landing conditions.

Mounted on support structure 5 is a main gear carriage drive 20 which operates to position the assembly with respect to the center of gravity (C.G.) of the vehicle as required. Carriage drive 20 is powered by a motor drive, of any known type, and is coordinated with the traverse adjustments of the forward and aft cable sheaves 6A and 6B. The assembly can be moved forward or aft without changing the position of sheaves 6A and 6B provided said sheaves are positioned far enough apart to span the maximum dimensional change of the vehicles C.G.

The operation of the carriage gear assembly 4 is to support the vehicle by absorbing landing loads, to raise and lower the gear, the wheels, and supporting assemblies from in-flight stowage to landing and/or take off positions, and to allow for proper adjustments with respect to the changes of C.G. in accordance with the mission requirements.

The arrangement and spacing of the wheel assemblies of the truss or support frame 12 spreads the load foot print pattern on the landing strip over a greater area thus lowering the p.s.i. to a more favorable factor, or allowable load, for the existing runways. Further, the wheel assembly can be positioned by the linkage connecting the gear truck 8 to the frame 12 so as to be parallel to the landing strip at touch down thus preventing high concentrated punching loads which could easily exceed the allowable load of the runway material.

Future aerospace craft, if attempting to employ conventional landing gear assemblies, would have to employ a canard to get the nose up at takeoff in order to increase the angle of attack, and resulting lift, on the main wing. In doing so all of the weight would suddenly be transferred to the rear gear thus causing a high "jumping off" load on the rear gear and runway material. The assembly of the instant invention would prevent this sudden load shift as the angle of attack could be gradually increased with velocity increase, and thus causing the wing to take up the load that would otherwise be transferred to the main or aft gear. "Jumping off" loads exceed static gross loads of the vehicle. The change in angle of attack can be accomplished by mechanical advantage rather than aerodynamically which is better since aerodynamic conditions vary with weather and altitude which factors do not affect mechanical advantage.

While only one of the carriage gear assemblies has been shown in detail, the other such assembly is substantially identical. A coordinating mechanism, not constituting part of this invention and therefore not shown, is used to actuate each of the carriage gear assemblies 4 in unison. Also, the control mechanism to actuate the drive units of the gear assembly 4 is not part of the instant invention and therefore has not been shown.

It has been shown that the carriage gear mechanism of the invention not only supports the vehicle during ground runs but tilts or changes the angle of attack of the vehicle to facilitate either launch or landing operations. The gear mechanism also raises and lowers the vehicle, tilts aft and fore body up or down as may be required for servicing, maintenance or shelter storage. Furthermore, the instant invention extends the limits of the aerospace plane vehicle toward a more universal operation than could be accomplished by a conventional tricycle type gear as generally used in present day gear designs. The instant gear assembly accomplishes these features without adding weight to a vehicle design and actually reduces the structural weights required by the presently known gear installations.

Although a particular embodiment of the invention has been illustrated and described, it will be obvious to those skilled in the art that various changes and modifications may be made without departing from the invention, and it is intended to cover in the appended claims all such changes and modifications that come within the true spirit and scope of the invention.

What I claim is:

1. In combination with an air vehicle having a fuselage, at least one carriage gear assembly therefor located substantially under the center of gravity of said vehicle and movable in a fore and aft direction with respect to said fuselage, said carriage gear assembly including: support means fixedly attached to said fuselage, adjustable strut means having one end movably positioned on said support means and the other end operatively connected to ground engaging means, means for actuating said adjustable strut means, at least two adjustable means movably positioned on said support means at locations extending in opposite directions from said strut means, means attached to said ground engaging means and extending through each of said adjustable means, and means for positioning said strut means and both said adjustable means with respect to said support means.

2. The device defined in claim 1 wherein the means which extends through said adjustable means comprises at least two cable means, said cable means crossing one another between said ground engaging means and said adjustable means to provide torsion stability.

3. The device defined in claim 2 wherein said adjustable means includes sheave means for each of said cable means; and means for maintaining said cable means under tension.

4. The device defined in claim 1 wherein the means which extends through said adjustable means comprises cable means; and means for maintaining said cable means under tension.

5. A carriage assembly for air vehicles comprising: support structure adapted to be attached to an air vehicle; adjustable main strut means movably mounted at one end thereof to said support structure and operatively connected at the other end through torsion linkage means to a truss-type structure having two pair of wheels, one of said pair of wheels being steerable; means for adjusting said main strut means; means for positioning said main strut means with respect to said support structure; adjustable means movably mounted on said support structure; means attached to said truss-type structure and extending through said adjustable means; means for moving said adjustable means with respect to said support structure; and means for maintaining the means extending through the adjustable means under tension.

6. The device defined in claim 5 wherein the means which extends through said adjustable means comprises cable means.

7. The device defined in claim 5 wherein the means which extends through said adjustable means comprises at least two cable means, said cable means crossing one another between said truss-type structure and said adjustable means to provide torsion stability.

8. The device defined in claim 7 wherein said adjustable means includes sheave means for each of said cable means.

9. In an air vehicle having a fuselage, wing means, and propulsion means, a pair of landing gear assemblies located substantially under the center of gravity of said vehicle and adapted to be moved in a fore and aft direction with respect to said fuselage; each of said landing gear assemblies including support means fixedly attached to said fuselage, adjustable strut means having one end movably positioned on said support means and the other end operatively connected to a frame assembly, an oleo operatively positioned at each end of said frame assembly, at least one wheel means being operatively connected to each of said oleos, means for actuating said adjustable strut means, a pair of sheave means movably positioned on said support means at locations extending in opposite directions from said strut means, cable means attached to said frame assembly and extending through each of said sheave means, means for maintaining said cable means tension loaded during all operating conditions, and means for moving said strut means with respect to each of said sheave means.

10. The device defined in claim 9 wherein each of said sheave means of each of said landing gear assemblies includes two sets of cable sheaves, and wherein said cable means of each landing gear assembly comprises two sets of cables, each set of cables extending around one set of sheaves of each of said sheave means, each set of cables crossing one another between said frame assembly and each said sheave means to provide torsion stability.

11. The device defined in claim 9 wherein each of said frame assemblies of each of said landing gear assemblies is operatively connected to the associated adjustable strut means through torsion linkage means, and wherein one of said wheel means of each landing gear assembly is steerable.

References Cited by the Examiner
UNITED STATES PATENTS

| 2,020,772 | 11/35 | Ellingston | 244—100 X |
| 2,481,379 | 9/49 | Zimmerman | 244—102 X |
| 2,577,385 | 12/51 | Troendle | 244—102 |
| 2,678,783 | 5/54 | Myers | 244—102 X |

MILTON BUCHLER, *Primary Examiner.*

ANDREW H. FARRELL, *Examiner.*